United States Patent
Teibel et al.

(10) Patent No.: US 6,353,451 B1
(45) Date of Patent: Mar. 5, 2002

(54) METHOD OF PROVIDING AERIAL PERSPECTIVE IN A GRAPHICAL USER INTERFACE

(75) Inventors: Daniel A. Teibel; Chiung-Chen Yu, both of Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/212,976

(22) Filed: Dec. 16, 1998

(51) Int. Cl.⁷ .................................................. G06F 3/00
(52) U.S. Cl. ........................ 345/803; 345/764; 345/794; 345/797; 345/804
(58) Field of Search .............................. 345/339, 344, 345/345, 346, 340, 343, 429, 439, 432, 355

(56) References Cited

U.S. PATENT DOCUMENTS

| | | | | |
|---|---|---|---|---|
| 5,390,295 A | * | 2/1995 | Bates et al. ................. 345/157 |
| 5,412,776 A | * | 5/1995 | Bloomfield et al. ........ 345/160 |
| 5,561,757 A | * | 10/1996 | Southgate ................... 345/157 |
| 5,666,498 A | * | 9/1997 | Amro ......................... 345/342 |
| 5,745,715 A | * | 4/1998 | Pichover et al. ............ 345/348 |
| 5,767,835 A | * | 6/1998 | Obbink et al. .............. 345/146 |
| 5,920,313 A | * | 7/1999 | Diedrichsen et al. ....... 345/339 |
| 6,025,841 A | * | 7/2000 | Finkelstein et al. ........ 345/342 |

* cited by examiner

Primary Examiner—Raymond J. Bayerl
Assistant Examiner—Cuong T. Thai
(74) Attorney, Agent, or Firm—Steven P. Skabrat

(57) ABSTRACT

Representing display objects, such as windows, in a graphical user interface in such a way as to indicate which display object should be focused on by a user as a currently active display object. The method includes modifying appearance characteristics of a first display object, the first display object transitioning from an active to an inactive state, to make the first display object appear farther from a user than at least one other display object. The method further includes modifying appearance characteristics of a second display object, the second display object transitioning from the inactive state to the active state, to make the second display object appear closer to the user than at least the first display object. The user intuitively recognizes the nearer display object as the currently active display object.

20 Claims, 5 Drawing Sheets

METHOD OF PROVIDING AERIAL PERSPECTIVE IN A GRAPHICAL USER INTERFACE

BACKGROUND

1. Field

The present invention relates generally to a graphical user interface in a system and, more specifically, to the use of aerial perspective in a graphical user interface.

2. Description

In a typical windowing environment of a graphical user interface (GUI), when a dialog box or child window is opened from a parent window of a program, such as an application program, one visual cue given to the user that the new child window in the GUI has the current primary focus (e. g., is "active") is that the new child window is in the foreground of the display and the parent window is in the background. That is, the child window typically obscures or occludes at least a portion of the parent window. Unfortunately, the size of the child window may be small relative to the size of the parent window, making the child window appear less obvious to the user. Furthermore, depending on the windowing environment, the foreground/background relationship of the windows may not be clear, even though the child window may partially occlude the parent window. Typically, the only other explicit visual or design cue provided by the GUI of an operating system (OS) (such as any of the versions of the Windows™ OS available from Microsoft Corporation, for example) that the parent window is inactive and the child window is active is that the title bar of the inactive window is changed to exhibit a color indicating that it is now inactive.

Additionally, when using a GUI, a user often has many windows open at a time on a display, with some of the windows perhaps even overlapping. Because the only design cue regarding the inactive/active status of a window is the color of the title bar, the problem of recognition of the active window by the user is made even more difficult in a crowded windowing environment having many open windows. The user, especially a novice user, may become confused as to which of the many windows is the active window to which attention should currently be focused.

Hence, there is a need in the user interface art to make systems easier to use by overcoming the confusion caused by inadequate design cues relating to active and inactive windows.

SUMMARY

An embodiment of the present invention is a method of representing display objects in a graphical user interface. The method includes modifying appearance characteristics of a first display object, the first display object transitioning from an active to an inactive state, to make the first display object appear farther from a user than at least one other display object. The method further includes modifying appearance characteristics of a second display object, the second display object transitioning from the inactive state to the active state, to make the second display object appear closer to the user than at least the first display object.

BRIEF DESCRIPTION OF THE DRAWINGS

The features and advantages of the present invention will become apparent from the following detailed description of the present invention in which.

DETAILED DESCRIPTION

Figure 1:
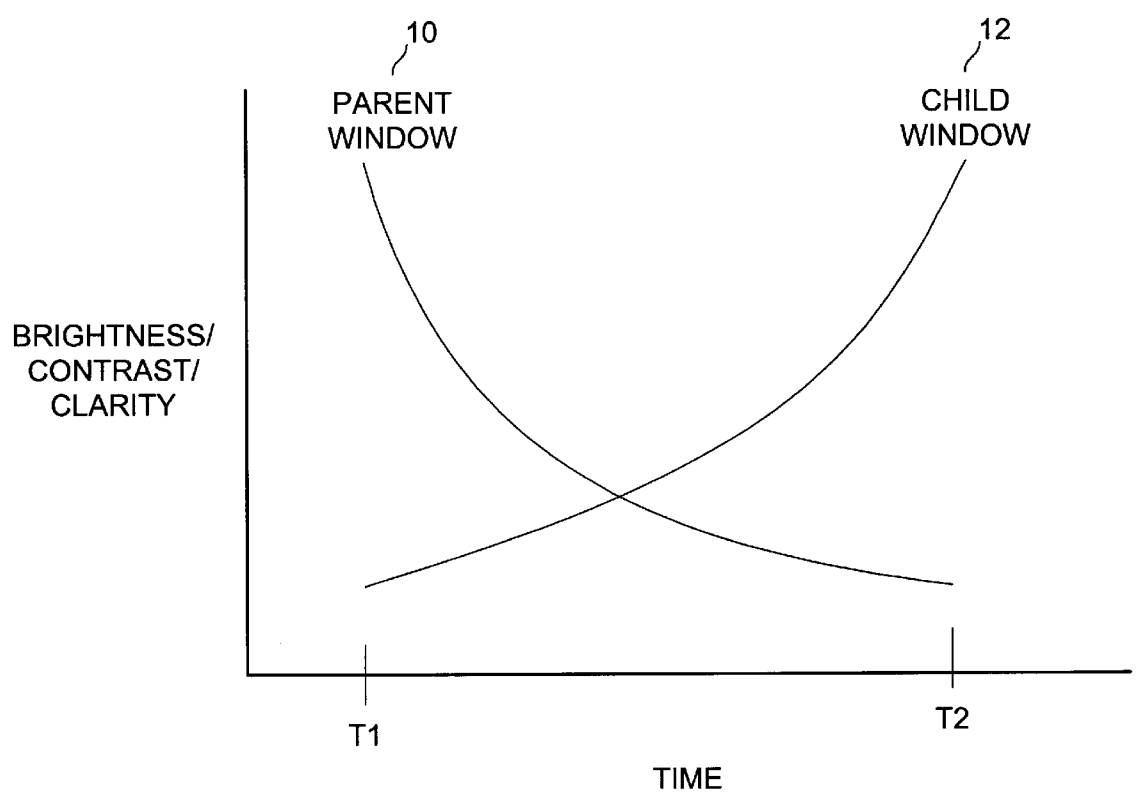
FIG. 1 is a diagram of the relative differences over time of appearance characteristics of two windows according to an embodiment of the present invention.

An embodiment of the present invention comprises a method for using aerial perspective as a design cue in a GUI so that a user immediately and intuitively knows that a particular display object, such as a window, is active and has the focus in a multiple window environment. Using aerial perspective, the typical two state system for active or inactive windows may be made more apparent to a user by changing the appearance of the relevant windows over time. Aerial perspective in this context comprises a mechanism for adjusting the brightness, contrast, and clarity of a display object, such as a window, for example, so that it appears to be distant to the user. Without aerial perspective, a display object typically appears to be near to the user. In a windowing environment, aerial perspective may be employed to indicate that a particular window is an active window and that one or more other windows are inactive. An active window will appear to be nearer to the user than inactive windows, and accordingly, inactive windows will appear to be farther away from the user than the active window. Aerial perspective is easily perceived by humans and may employ no higher level cognitive processing to determine which objects appear on a display to be near the user and which objects appear to be far from the user. This is in contrast to typical three dimensional (3-D) perspective design cues that may be difficult for people to process and understand, especially when objects such as windows are projected on a two dimensional (2-D) surface of a display, such as a computer monitor, for example.

Although the present discussion uses windows in a GUI as an example, it is to be understood that aerial perspective may be used in a GUI to affect the appearance characteristics of any type of display object. Furthermore, the aerial perspective treatment may be applied to selected display objects by an individual application program or may be implemented by an OS for selected display objects of a specified type or selected display objects in general.

In one embodiment, a window may be initially displayed by a program, such as an application program or an OS, for example, on a display to a user. This window, called a first window or a parent window, may have various appearance characteristics such as size, shape, one or more colors, "always on top," and so on. Three additional window appearance characteristics relevant to embodiments of the present invention are brightness (or intensity), contrast, and clarity (or sharpness). Brightness is the effect or sensation by means of which an observer is able to distinguish differences in luminance. Contrast is the use of opposing elements, such as color, in proximity to produce an intensified effect. Clarity herein refers to the clearness of a displayed image. In one embodiment, the clarity of an image may be adjusted by applying a low pass filter to the image. In one embodiment, operation of the low pass filter comprises defining a region of the image and computing the average color and/or brightness of pixels of the region, depending on what color space the image is represented (e.g., red, green, and blue (RGB) or hue, saturation and value (HSV)). The low pass filter further comprises replacing the values of the original pixels of the region with the computed average value, and performing these steps for all regions of the image. Hence, the image may be made to appear clear or blurred based on these computations, although the invention is not limited in scope in this respect. When a parent window is first displayed, the brightness, contrast, and clarity characteristics may be set such that the parent window appears to be near to the user and in focus.

When another window, called a second window or a child window, related to the first window is desired, the parent window's appearance characteristics may be modified to make it appear to the user that the parent window is moving away from the user using aerial perspective design cues. That is, the parent window's brightness, contrast, and clarity are decreased over a first period of time, thereby indicating to the user that the parent window is now inactive. The child window may be first displayed with an initial setting of brightness, contrast, and clarity, and then modified by increasing the brightness, contrast, and clarity of the child window over a second period of time, thereby indicating to the user that the child window is now active. In one embodiment, the modifications to the appearance characteristics of the parent and child windows may be made concurrently. In one embodiment, the first and second periods of time are the same, representing a smooth visual transition of active focus from one window to the next. In another embodiment, the child window may be initially displayed at a predetermined brightness, contrast, and clarity setting, and not subsequently modified. In yet another embodiment, the first and/or second periods of time may be zero, such that the parent window is abruptly changed to an inactive state appearance and the child window is changed to an active state appearance in a single action rather than by a series of appearance modifications.

In one embodiment, the parent and child windows are controlled by a single program, such as an application program, for example. In another embodiment, the two windows may be controlled by independent programs, or may even be a feature implemented by an OS.

FIG. 1 is a diagram of the relative differences over time of appearance characteristics of two windows according to an embodiment of the present invention. Initially and in one embodiment, at time T1, a parent window 10 may have a relatively high setting of brightness, contrast, and clarity, and a child window 12 may have a relatively low setting of brightness, contrast, and clarity. The parent window may appear to be close to the user and active. The child window may appear to be far from the user and inactive. Over time, the relative settings of these window characteristics may be adjusted as shown. Thus, at time T2, the parent window may have a relatively low setting of brightness, contrast, and clarity, and the child window may have a relatively high setting of brightness, contrast, and clarity. At time T2, the parent window may appear to be far from the user and inactive, and the child window may appear to be close to the user and active. In one embodiment, the amount of time between T1 and T2 may be relatively small, representing a smooth, quick, and aesthetically appealing transition to the user. The transition may provide a visual design cue to the user that the status of the two windows have changed. In another embodiment, the roles of the parent window and the child window with respect to the relationships between brightness/contrast/clarity and time as shown in FIG. 1 may be exchanged.

Although in FIG. 1 the time intervals for changing the appearances of the parent and child windows are the same, this is only one example, and the invention is not limited in scope in this respect. In other embodiments, the time intervals of changing appearances of the parent and child windows may not overlap in time nor may they be of equal duration. Additionally, in FIG. 1, the slopes and functions of the curves shown are similar. However, this again is only one example of such curves, and the invention is not limited in scope in this respect. In other embodiments, other slopes and functions may be employed.

Figure 2:
FIG. 2 is a diagram of a sample treatment of an application program's parent window and a child window according to an embodiment of the present invention.

FIG. 2 is a diagram of a sample treatment of an application program's parent window and a child window according to an embodiment of the present invention. This example shows an active child window 20 overlaying an inactive parent window 22. This state corresponds to time T2 of FIG. 2. Note how in this treatment the child window exhibits a relatively high degree of brightness, contrast, and clarity, and the parent window exhibits a relatively low degree of brightness, contrast, and clarity. In this treatment, the inactive parent window appears to be slightly darker and "fuzzier" than the active window. In another embodiment, however, the inactive window may be made to appear to be lighter and "fuzzier". The specific treatment used (e.g., darker indicating inactive or lighter indicating inactive), may be selected in advance by the user.

Figure 3:
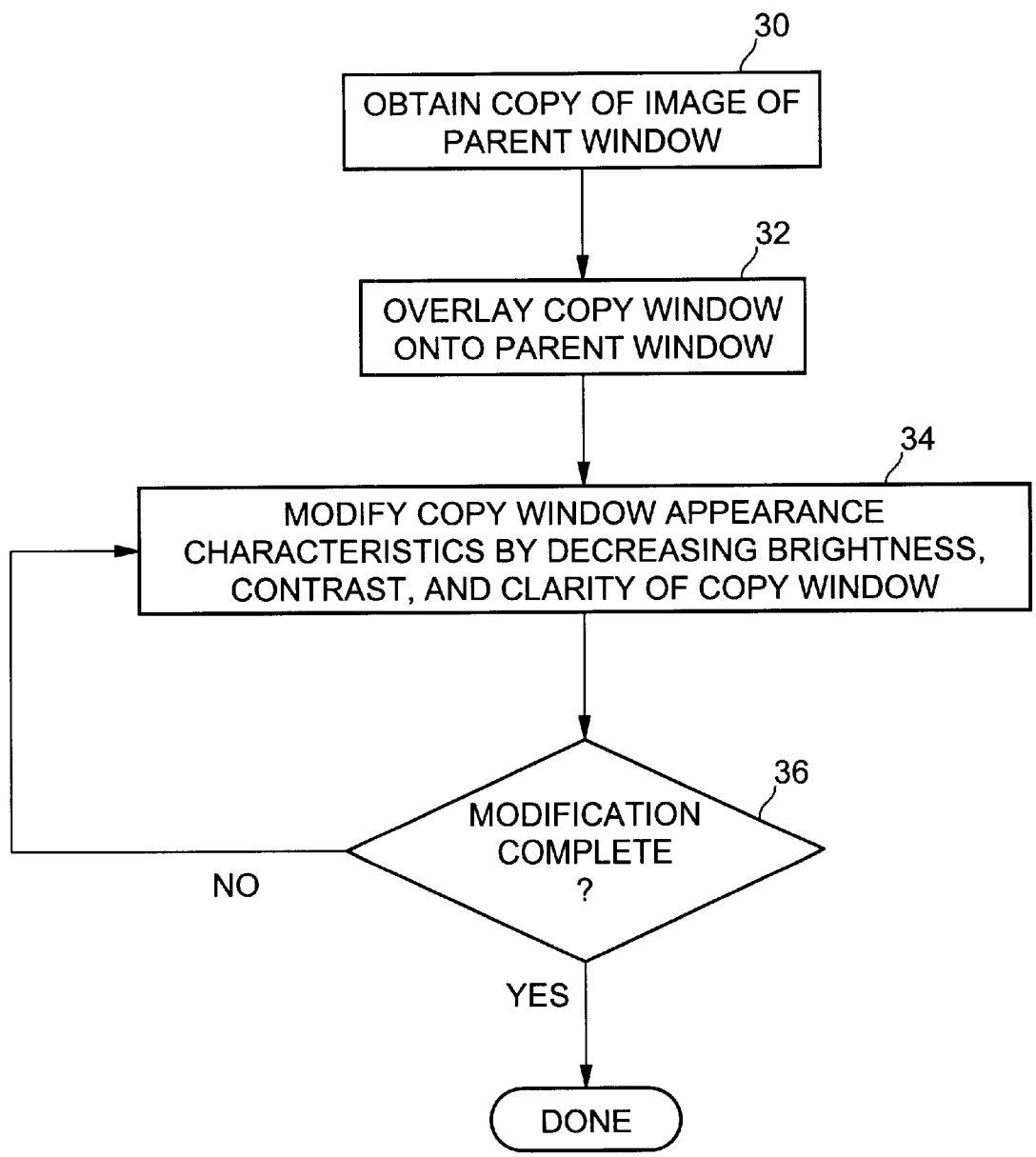
FIG. 3 is a flow diagram of a method of using aerial perspective to modify a parent window according to an embodiment of the present invention.

FIG. 3 is a flow diagram of a method of using aerial perspective to modify a parent window according to an embodiment of the present invention. At block 30, a copy of the image in a parent window (or first window) may be obtained. This copy may be obtained by copying the display data of the parent window from a frame buffer or other data structure. Note that the contents of the copy window may be determined in real-time in order to display the actual current image of the parent window immediately prior to its representation in an inactive state. The copy window may be overlayed onto the parent window on the display at block 32, in effect completely obscuring the parent window with the copy window. Of course, at this point in time the user does not notice a difference in appearance because the windows are currently identical. The copy window may then be modified at block 34 by changing the window appearance characteristics of the copy window. In the embodiment shown in block 34, the brightness, contrast, and clarity of the copy window may be decreased. In another embodiment, the brightness of the copy window may be increased while the contrast and clarity of the copy window may be decreased. At block 36, it may be determined if modification of the copy window's appearance characteristics is complete. If so, parent window modification processing is done. If parent window modification processing is not complete, parent window modification processing proceeds with block 34 to further change the copy window's appearance. These actions may be repeated over time to effect a changing appearance of the copy window.

Figure 4:
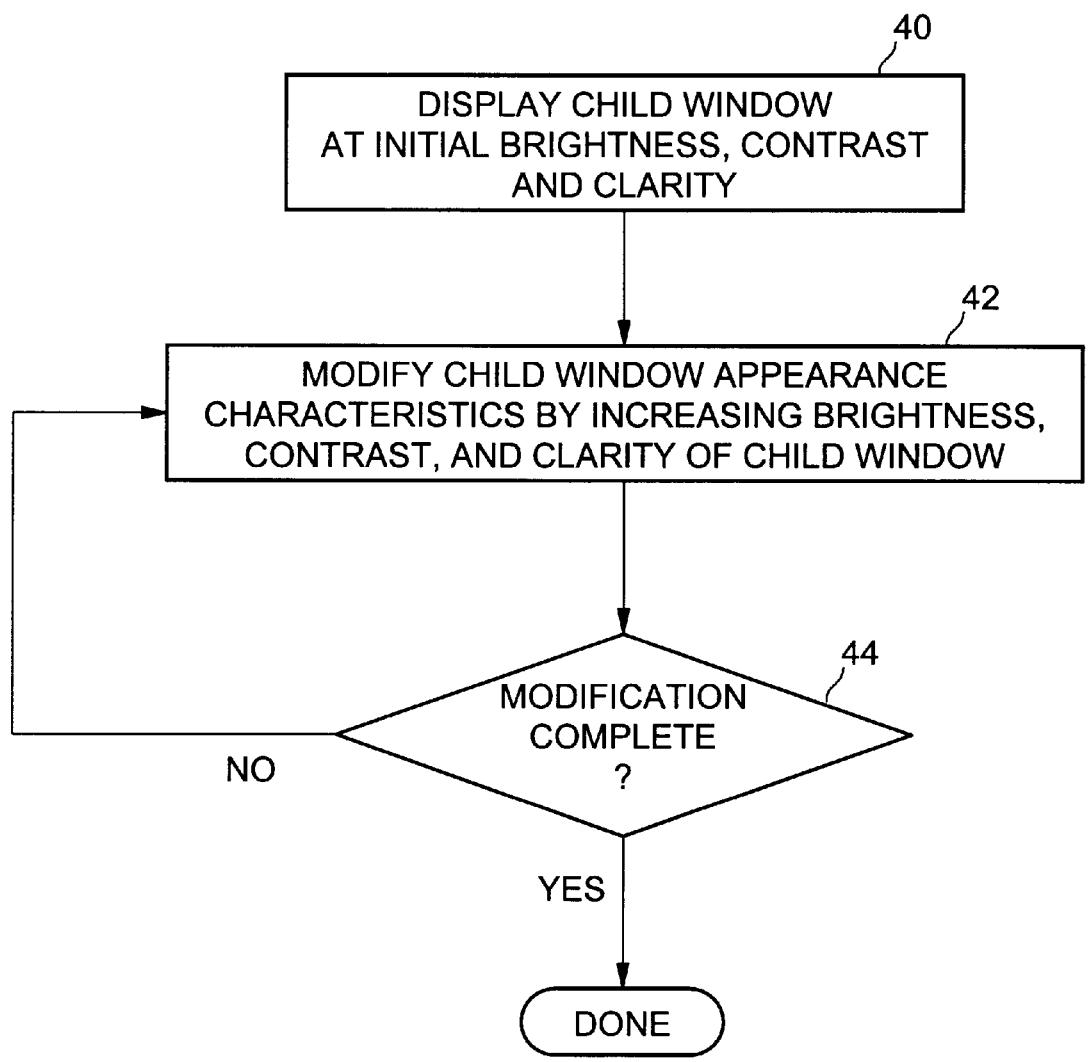
FIG. 4 is a flow diagram of a method of using aerial perspective to modify a child window according to an embodiment of the present invention.

Concurrently with the actions of FIG. 3 for a parent window modification, the appearance characteristics of a child window may also be modified. FIG. 4 is a flow diagram of a method of using aerial perspective to modify a child window according to an embodiment of the present invention. At block 40, a child window (or second window) may be displayed at an initial brightness, contrast, and clarity. In one embodiment, the child window may be displayed within the perimeter of the parent window as is shown in FIG. 2, although the invention is not limited in scope in this respect. At block 42, the appearance characteristics of the child window may be modified. In the embodiment shown in block 42, the brightness, contrast, and clarity of the child window may be increased. At block 44, it may be determined if modification of the child window's appearance characteristics is complete. If so, child window modification processing is done. If child window modification processing is not complete, child window modification processing proceeds with block 42 to further change the child window's appearance. These actions may be repeated over time to effect a changing appearance of the child window. Alternatively, the child window may be displayed at an initial setting of brightness, contrast, and clarity and not thereafter modified, although the invention is not limited in scope in this respect.

When the child window is no longer employed, the child window and the copy window may be deleted from the display, thereby restoring the parent window to full view and current active status. Alternatively, the child window may be slowly dissolved over an interval of time and then removed, rather than being deleted abruptly, and the parent window may also be restored over another interval of time. In this case, the relationships between brightness/contrast/clarity and time for the parent and child windows shown in FIG. 1 may be exchanged such that the child window's brightness/contrast/clarity may be relatively high at a time T1 and decline thereafter, and the parent window's brightness/contrast/clarity may be relatively low at time T1 and increase thereafter.

In the preceding description, various aspects of the present invention have been described. For purposes of explanation, specific numbers, systems and configurations were set forth in order to provide a thorough understanding of the present invention. However, it is apparent to one skilled in the art that the present invention may be practiced without the specific details. In other instances, well-known features were omitted or simplified in order not to obscure the present invention.

Embodiments of the present invention may be implemented in hardware or software, or a combination of both. However, embodiments of the invention may be implemented as computer programs executing on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the invention is not limited in scope to any particular programming language. In any case, the language may be a compiled or interpreted language.

The programs may be stored on a storage media or device (e.g., hard disk drive, floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

Figure 5:
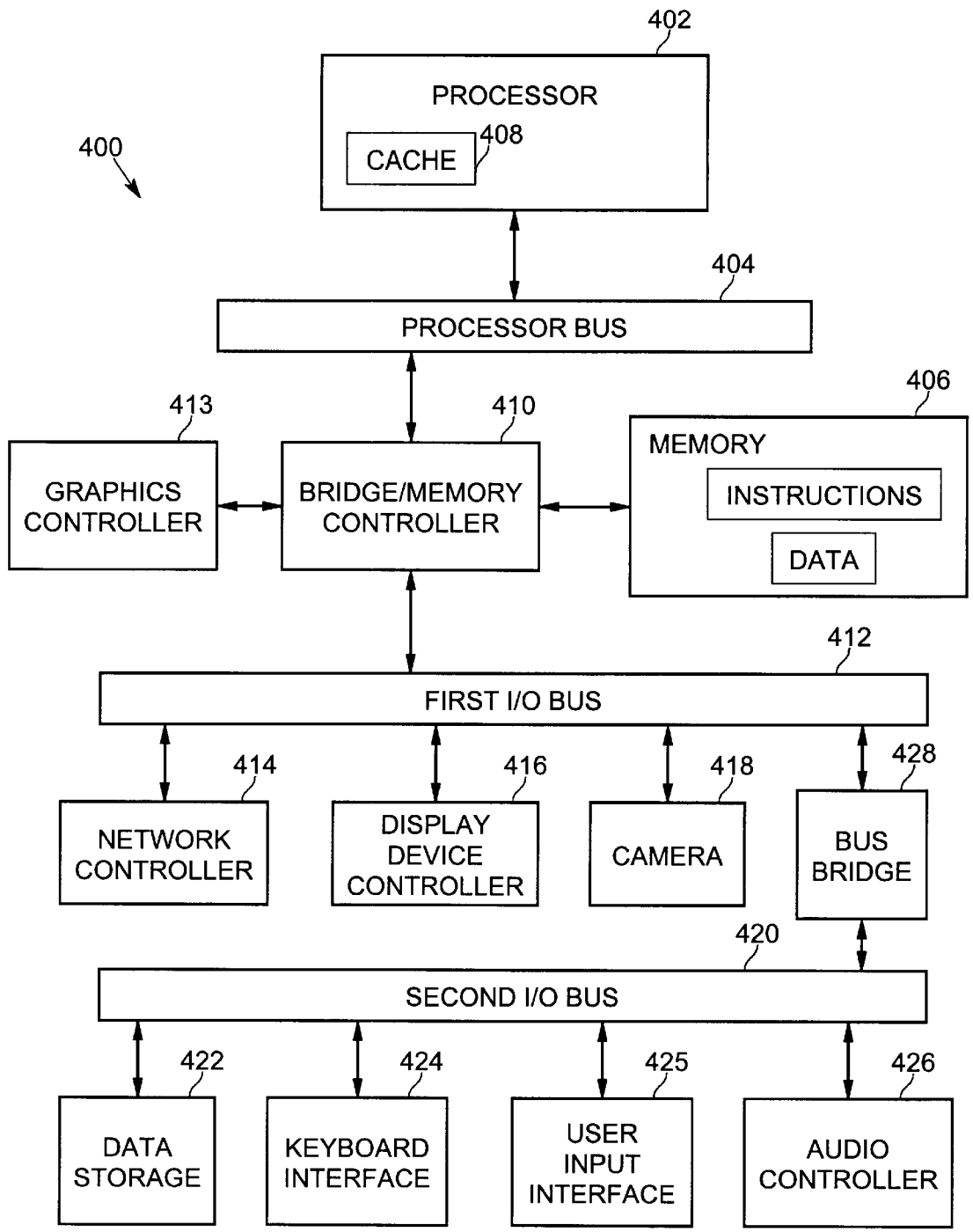
FIG. 5 is a diagram illustrating a sample system capable of being operated according to an embodiment of a method of providing aerial perspective in accordance with the present invention.

An example of one such type of processing system is shown in FIG. 5. Sample system 400 may be used, for example, to execute the processing for embodiments of a method for using aerial perspective to represent windows in a windowing environment, in accordance with the present invention, such as the embodiment described herein. Sample system 400 is representative of processing systems based on the PENTIUM®, PENTIUM® Pro, and PENTIUM® II microprocessors available from Intel Corporation, although other systems (including personal computers (PCs) having other microprocessors, engineering workstations, set-top boxes and the like) may also be used. In one embodiment, sample system 400 may be executing a version of the WINDOWS™ operating system available from Microsoft Corporation, although other operating systems and graphical user interfaces, for example, may also be used.

FIG. 5 is a block diagram of a system 400 of one embodiment of the present invention. The computer system 400 includes a processor 402 that processes data signals. The processor 402 may be a complex instruction set computer (CISC) microprocessor, a reduced instruction set computing (RISC) microprocessor, a very long instruction word (VLIW) microprocessor, a processor implementing a combination of instruction sets, or other processor device, such as a digital signal processor, for example. FIG. 5 shows an example of an embodiment of the present invention implemented as a single processor system 400. However, it is understood that embodiments of the present invention may alternatively be implemented as systems having multiple processors. Processor 402 may be coupled to a processor bus 404 that transmits data signals between processor 402 and other components in the system 400.

System 400 includes a memory 406. Memory 406 may be a dynamic random access memory (DRAM) device, a static random access memory (SRAM) device, or other memory device. Memory 406 may store instructions and/or data represented by data signals that may be executed by processor 402. The instructions and/or data may comprise code for performing any and/or all of the techniques of the present invention. Memory 406 may also contain additional software and/or data (not shown). A cache memory 408 may reside inside processor 402 that stores data signals stored in memory 406. Cache memory 408 in this embodiment speeds up memory accesses by the processor by taking advantage of its locality of access. Alternatively, in another embodiment, the cache memory may reside external to the processor.

A bridge/memory controller 410 may be coupled to the processor bus 404 and memory 406. The bridge/memory controller 410 directs data signals between processor 402, memory 406, and other components in the system 400 and bridges the data signals between processor bus 404, memory 406, and a first input/output (I/O) bus 412. In some embodiments, the bridge/memory controller provides a graphics port for coupling to a graphics controller 413. In this embodiment, graphics controller 413 interfaces to a display device (not shown) for displaying images rendered or otherwise processed by the graphics controller 413 to a user. The display device may comprise a television set, a computer monitor, a flat panel display, or other suitable display device.

First I/O bus 412 may comprise a single bus or a combination of multiple buses. First I/O bus 412 provides communication links between components in system 400. A network controller 414 may be coupled to the first I/O bus 412. The network controller links system 400 to a network that may include a plurality of processing systems (not shown in FIG. 5) and supports communication among various systems. The network of processing systems may comprise a local area network (LAN), a wide area network (WAN), the Internet, or other network. In some embodiments, a display device controller 416 may be coupled to the first I/O bus 412. The display device controller 416 allows coupling of a display device to system 400 and acts as an interface between a display device (not shown) and the system. The display device may comprise a television set, a computer monitor, a flat panel display, or other suitable display device. The display device receives data signals from processor 402 through display device controller 416 and displays information contained in the data signals to a user of system 400.

In some embodiments, camera 418 may be coupled to the first I/O bus to capture live events. Camera 418 may comprise a digital video camera having internal digital video capture hardware that translates a captured image into digital graphical data. The camera may comprise an analog video camera having digital video capture hardware external to the video camera for digitizing a captured image. Alternatively, camera 418 may comprise a digital still camera or an analog still camera coupled to image capture hardware. A second I/O bus 420 may comprise a single bus or a combination of multiple buses. The second I/O bus 420 provides communication links between components in system 400. A data storage device 422 may be coupled to the second I/O bus 420. The data storage device 422 may comprise a hard disk drive, a floppy disk drive, a CD-ROM device, a flash memory device, or other mass storage device. Data storage device 422 may comprise one or a plurality of the described data storage devices.

A keyboard interface 424 may be coupled to the second I/O bus 420. Keyboard interface 424 may comprise a keyboard controller or other keyboard interface device. Keyboard interface 424 may comprise a dedicated device or may reside in another device such as a bus controller or other controller device. Keyboard interface 424 allows coupling of a keyboard to system 400 and transmits data signals from a keyboard to system 400. A user input interface 425 may be coupled to the second I/O bus 420. The user input interface may be coupled to a user input device, such as a mouse, joystick, or trackball, for example, to provide input data to the computer system. Audio controller 426 may be coupled to the second I/O bus 420. Audio controller 426 operates to coordinate the recording and playback of audio signals. A bus bridge 428 couples first I/O bridge 412 to second I/O bridge 420. The bus bridge operates to buffer and bridge data signals between the first I/O bus 412 and the second I/O bus 420.

Embodiments of the present invention are related to the use of the system 400 to provide aerial perspective design cues in representing windows in a windowing environment. According to one embodiment, such processing may be performed by the system 400 in response to processor 402 executing sequences of instructions in memory 404. Such instructions may be read into memory 404 from another computer-readable medium, such as data storage device 422, or from another source via the network controller 414, for example. Execution of the sequences of instructions causes processor 402 to provide aerial perspective design cues in representing windows in a windowing environment according to embodiments of the present invention. In an alternative embodiment, hardware circuitry may be used in place of or in combination with software instructions to implement embodiments of the present invention. Thus, the present invention is not limited to any specific combination of hardware circuitry and software.

The elements of system 400 perform their conventional functions well-known in the art. In particular, data storage device 422 may be used to provide long-term storage for the executable instructions and data structures for embodiments of methods of providing aerial perspective design cues in representing windows in a windowing environment in accordance with the present invention, whereas memory 406 is used to store on a shorter term basis the executable instructions of embodiments of the methods for providing aerial perspective design cues in representing windows in a windowing environment in accordance with the present invention during execution by processor 402.

While this invention has been described with reference to illustrative embodiments, this description is not intended to be construed in a limiting sense. Various modifications of the illustrative embodiments, as well as other embodiments of the invention, which are apparent to persons skilled in the art to which the inventions pertains are deemed to lie within the spirit and scope of the invention.

What is claimed is:

1. A method of representing display objects comprising:
   modifying appearance characteristics of a first display object, the appearance characteristics comprising at least one of brightness, contrast, and clarity, the first display object transitioning from an active to an inactive state, to make the first display object appear farther from a user than at least one other display object, by
      defining a region of an image portrayed by the first display object,
      determining an average value of pixels of the region;
      replacing values of pixels of the region in the first display object with the average value: and
      repeating the defining, determining, and replacing actions for all regions of the first display object; and
   modifying appearance characteristics of a second display object, the second display object transitioning from the inactive state to the active state, to make the second display object appear closer to the user than at least the first display object.

2. The method of claim 1, wherein modifying appearance characteristics of the first display object comprise decreasing at least one of brightness, contrast, and clarity of the first display object.

3. The method of claim 1, wherein modifying appearance characteristics of the first display object comprise decreasing brightness, contrast, and clarity of the first display object.

4. The method of claim 1, wherein modifying appearance characteristics of the first display object comprise increasing brightness and decreasing contrast and clarity of the first display object.

5. The method of claim 1, wherein modifying appearance characteristics of the second display object comprise increasing at least one of brightness, contrast, and clarity of the second display object.

6. The method of claim 1, wherein the first and second display objects comprise windows in a windowing environment.

7. The method of claim 6, wherein the first display object comprises a parent window, and the second display object comprises a child window.

8. The method of claim 1, further comprising repeating the modifying of appearance characteristics of the first display object over a first period of time.

9. The method of claim 1, further comprising repeating the modifying of appearance characteristics of the second display object over a second period of time.

10. The method of claim 1, further comprising repeating the modifying of appearance characteristics of the first display object over a first period of time, and repeating the modifying of appearance characteristics of the second display object over a second period of time, wherein the first period of time equals the second period of time.

11. An article comprising: a machine readable medium having a plurality of machine readable instructions, wherein when the instructions are executed by a processor, the instructions cause modification of appearance characteristics of a first display object, the appearance characteristics comprising at least one of brightness, contrast, and clarity, the first display object transitioning from an active to an inactive state, thereby making the first display object appear farther from a user than at least one other display object, by defining a region of an image portrayed by the first display object, determining an average value of pixels of the region, replacing values of pixels of the region in the first display object with the average value, and repeating the defining, determining, and replacing actions for all regions of the first display object; and modification of appearance characteristics of a second display object, the second display object transitioning from the inactive state to the active state, thereby making the second display object appear closer to the user than at least the first display object.

12. The article of claim 11, wherein instructions to modify appearance characteristics of the first display object comprise instructions to decrease at least one of brightness, contrast, and clarity of the first display object.

13. The article of claim 11, wherein instructions to modify appearance characteristics of the first display object comprise instructions to decrease brightness, contrast, and clarity of the first display object.

14. The article of claim 11, wherein instructions to modify appearance characteristics of the first display object comprise instructions to increasing brightness and decreasing contrast and clarity of the first display object.

15. The article of claim 11, wherein instructions to modify appearance characteristics of the second display object comprise instructions to increase at least one of brightness, contrast, and clarity of the second display object.

16. The article of claim 11, wherein the first and second display objects comprise windows in a windowing environment.

17. The article of claim 16, wherein the first display object comprises a parent window, and the second display object comprises a child window.

18. The article of claim 11, further comprising instructions to repeat the modification of appearance characteristics of the first display object over a first period of time.

19. The article of claim 11, further comprising instructions to repeat the modification of appearance characteristics of the second display object over a second period of time.

20. The article of claim 11, further comprising instructions to repeat the modification of appearance characteristics of the first display object over a first period of time, and to repeat the modification of appearance characteristics of the second display object over a second period of time, wherein the first period of time equals the second period of time.

* * * * *